United States Patent
Wuidart

(10) Patent No.: US 8,806,109 B2
(45) Date of Patent: Aug. 12, 2014

(54) PROTECTION OF SECRET KEYS

(75) Inventor: Sylvie Wuidart, Pourrieres (FR)

(73) Assignee: STMicroelectronics (Rousset) SAS, Rousset (FR)

(*) Notice: Subject to any disclaimer, the term of this patent is extended or adjusted under 35 U.S.C. 154(b) by 135 days.

(21) Appl. No.: 13/189,672

(22) Filed: Jul. 25, 2011

(65) Prior Publication Data
US 2012/0030443 A1    Feb. 2, 2012

(30) Foreign Application Priority Data
Jul. 27, 2010 (FR) ...................................... 10 56177

(51) Int. Cl.
*G06F 12/02* (2006.01)
*G06F 21/79* (2013.01)

(52) U.S. Cl.
CPC ............ *G06F 12/0246* (2013.01); *G06F 21/79* (2013.01)
USPC ........................................................ 711/103

(58) Field of Classification Search
None
See application file for complete search history.

(56) References Cited

U.S. PATENT DOCUMENTS

| 4,888,802 | A  | * | 12/1989 | Cooney ......................... 380/277 |
| 6,160,734 | A  | * | 12/2000 | Henderson et al. ...... 365/185.04 |
| 7,739,506 | B2 |   | 6/2010  | Funahashi et al. |
| 2001/0016910 | A1 |   | 8/2001 | Tanimoto et al. |
| 2005/0086471 | A1 | * | 4/2005 | Spencer ....................... 713/165 |

OTHER PUBLICATIONS

French Search Report dated Mar. 10, 2011from corresponding French Application No. 10/56177.

\* cited by examiner

*Primary Examiner* — Duc Doan
(74) *Attorney, Agent, or Firm* — Wolf, Greenfield & Sacks, P.C.

(57) ABSTRACT

A method for protecting at least first data of a non-volatile memory from which the extraction of this first data is triggered by the reading or the writing, by a processor from or into the memory, of second data independent from the first data, said first data being provided to a circuit which the processor cannot access.

23 Claims, 2 Drawing Sheets

US 8,806,109 B2

PROTECTION OF SECRET KEYS

CROSS REFERENCE TO RELATED APPLICATIONS

This application claims the priority benefit of French patent application number 10/56177, filed on Jul. 27, 2010, entitled PROTECTION OF SECRET KEYS, which is hereby incorporated by reference to the maximum extent allowable by law.

BACKGROUND OF THE INVENTION

1. Field of the Invention

The present invention generally relates to electronic circuits and, more specifically, to the protection of data manipulated by an electronic circuit integrating a processor and at least one non-volatile memory.

The present invention especially applies to chip cards and other secure integrated circuits.

2. Discussion of Related Art

Chip cards, or more generally so-called secure integrated circuits, are generally equipped with an integrated circuit comprising a microprocessor and several memories, among which a non-volatile and volatile memories.

Such devices manipulate so-called secret data, that is, data to which only one or several users are allowed to access. It is generally spoken of secret keys, which are used by encryption algorithms to protect or to authenticate data (messages, images, video, etc.).

The secret data are generally stored in a non-volatile memory of the integrated circuit and are considered as protected within this memory.

A weak point of such devices is that when the keys have to be manipulated by the circuit processor, they are likely to transit over a data bus shared by the microprocessor and other elements of the circuit, and risk being pirated, for example, by so-called side channel attacks which examine, for example, the circuit consumption, its radiation, etc.

Various methods have already been provided to try to protect the keys manipulated by a secure circuit.

For example, document EP-A-1880387 describes a system for protecting a memory against fault injection attacks.

It has also already been provided to encrypt transmissions over the bus. This avoids a possible piracy during the transfer between the memory and the processor registers.

However, due the advance in data piracy, the vulnerability when data are manipulated by the circuit processor has increased. Even if the secret data are most often masked by random numbers or other protection solutions, there is a time when they plainly appear in one of the processor registers. Recent studies have shown that it was then possible to pirate these critical data from such registers.

SUMMARY OF THE INVENTION

An embodiment is to provide a system for protecting secret data stored in a non-volatile memory, which overcomes all or part of the disadvantages of current systems.

Another embodiment is to avoid making secret data vulnerable when they are being used by the circuit processor.

An embodiment provides a method for protecting at least first data of a non-volatile memory from which the extraction of this first data is triggered by the reading or the writing, by a processor from or into said memory, of second data independent from the first data, said first data being provided to a circuit which said processor cannot access.

According to an embodiment, the address of the first data is a function of the address of the second data.

According to an embodiment, the address of the first data is obtained by offsetting of the address of the second data.

According to an embodiment, the first data is provided to a logic circuit.

According to an embodiment, said first data forms a secret key of an encryption or authentication algorithm.

An embodiment also provides an integrated circuit comprising:

a processor;

at least one data bus and one address bus accessible by said processor and to which are connected at least one program memory and one non-volatile memory, the non-volatile memory being, at the data output, associated with a selector connected on the one hand to the data bus and on the other hand to a logic circuit.

According to an embodiment, an address decoder calculates the address of the first data from the address of the second data.

An embodiment also provides a chip card comprising such a circuit.

The foregoing and other objects, features, and advantages of embodiments will be discussed in detail in the following non-limiting description of specific embodiments in connection with the accompanying drawings.

DETAILED DESCRIPTION

Figure 1:
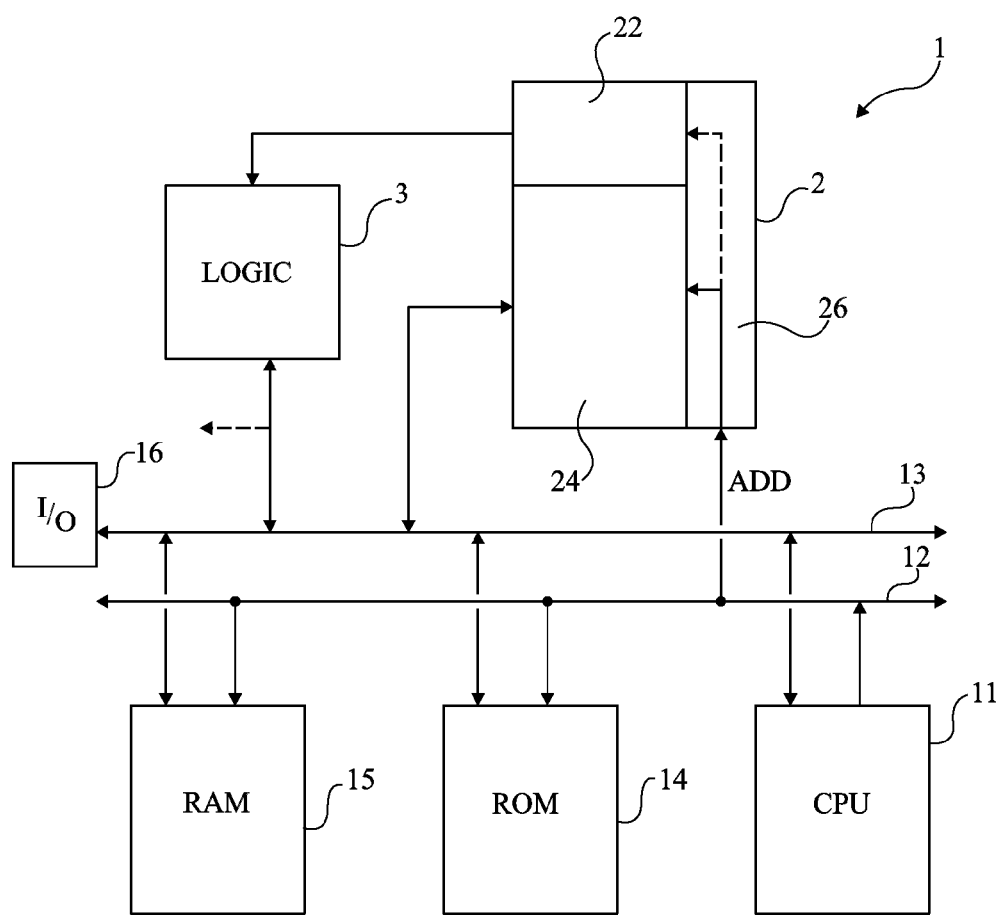
FIG. 1 is a block diagram of an embodiment of an electronic circuit.

The same elements have been designated with the same reference numerals in the different drawings. For clarity, only those elements which are useful to the understanding of the embodiments have been shown and will be described. In particular, the secret data manipulation algorithms have not been detailed, the embodiments being compatible with any usual algorithm. Further, the mechanisms making the processing unit of the processor call critical data have not been detailed either, the embodiments being here again compatible with programs usually manipulated by such a processor.

FIG. 1 shows, in the form of blocks, an example of architecture of an integrated electronic circuit 1. Usually, such a circuit comprises a processor or central processing unit 11 (CPU) capable of communicating via at least one address bus 12 and one data bus 13 with other circuit elements, among which at least one non-volatile memory 2, rewritable or not. In the example of FIG. 1, circuit 1 comprises a read-only memory 14 (ROM), a volatile memory 15 (RAM), and an input-output circuit 16 (I/O) capable of communicating with the outside of the circuit. Other connections (for example, one or several control buses) or other circuits, not shown, may be integrated to circuit 1. According to this embodiment, non-volatile memory 2 is divided into at least two areas 22 and 24, among which area 22 has no access to the data bus. In other words, the data of area 24 are accessible in read and write mode by microprocessor 11 from the address and data buses, while the data of area 22 are only accessible in read mode and are not provided to bus 13. In the example of FIG. 1, the data of area 22 are provided to a logic circuit 3 (LOGIC) having the function of processing the secret data originating from area 22 by a parameterizable or wired logic.

Logic circuit 3 may be of different natures. It may be a hard-wired state machine, a programmable or reconfigurable logic circuit. According to cases, this circuit may comprise one or several registers (not shown) which receive the secret data only when these data are needed. Circuit 3 provides the result of its processing to processor 11 over the data bus, but the key never exits circuit 3. Thus, conversely to a usual circuit, the key is not provided to circuit 3 by processor 11, but directly by the memory.

Circuit 3 cannot be accessed by processor 11, that is, only the result(s) of its processing are provided. However, the processor cannot access to the possible internal registers of circuit 3.

The reading of the secret data from memory 2 is triggered, as usual, by the program executed by central processing unit 11.

Figure 2:
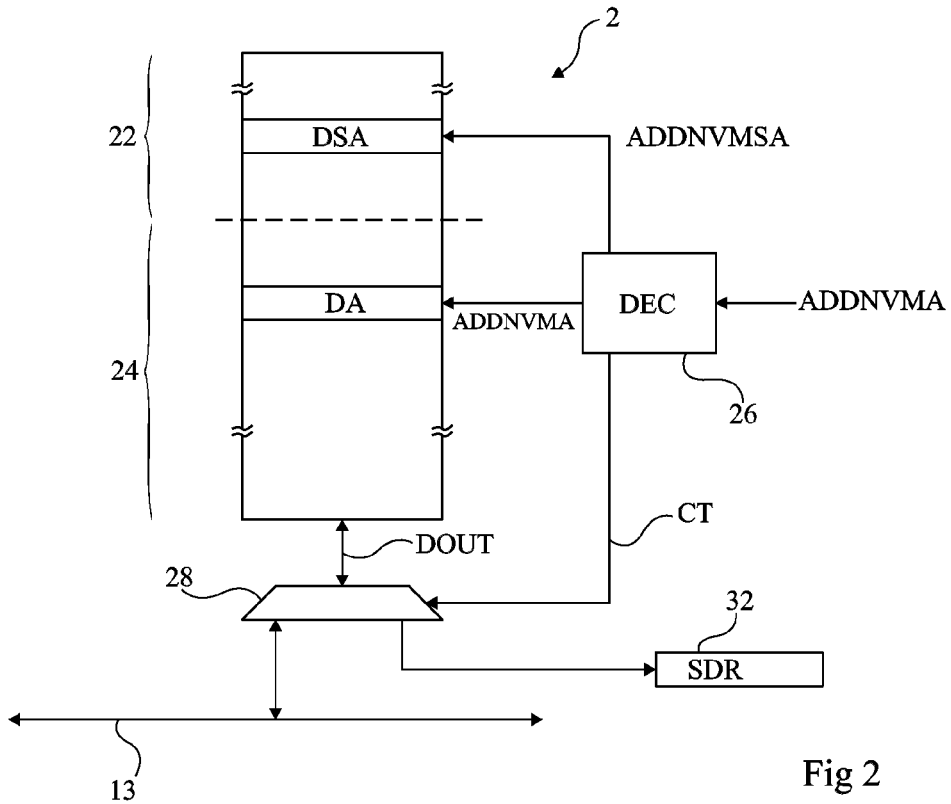
FIG. 2 very schematically shows an embodiment of a non-volatile memory.

FIG. 2 very schematically shows a non-volatile memory 2. Output DOUT of memory plane 2 is associated with a one-to-two branching circuit 28 (for example, a multiplexer), having its respective inputs-outputs connected on the one hand to data bus 13 and on the other hand to one or several temporary registers 32 (SDR) of logic circuit 3 used to temporary store the secret data. Multiplexer 28 is controlled by a signal CT originating, for example, from an address decoder 26. Address decoder 26 of memory 2 receives an address ADDNVMA from microcontroller 11 and has the function of addressing data in accessible area 24 and, if need be, data in secret area 22. When decoder 26 receives an address ADDNVMA, it addresses area 24 at this address and calculates an address ADDNVMSA in area 22. Data DA of area 24 is provided to the data bus while secret data DSA is provided to register 32. For example, when a determined address is called by the central processing unit, decoder 26 automatically generates an address in the critical area by adding an offset value (OFFSET) in this address. Other calculation modes may be provided.

Figure 3:
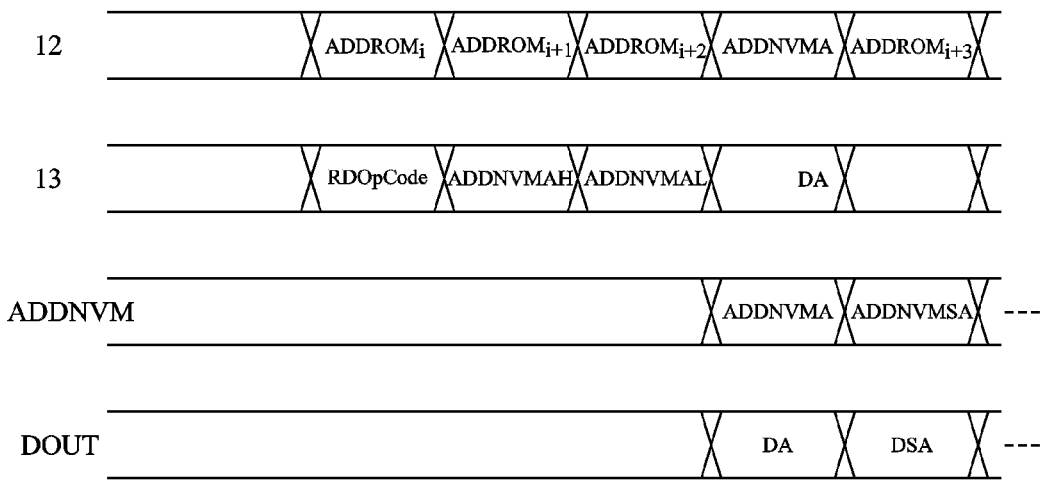
FIG. 3 illustrates the address and data exchanges in the memory of FIG. 3 for the reading of secret data.

FIG. 3 illustrates, in timing diagrams, an example of extraction of secret data from area 22. This drawing illustrates an example of addresses present on bus 12 of the circuit, of data present on bus 13 of internal addresses ADDNVM of non-volatile memory 2, and of data present on output DOUT of memory 2. For simplification, the time delays due to the signal propagation have been neglected.

In the shown example, it is assumed that a secret key DSA needs to be extracted from memory 2 and that the program calling this secret key is stored in ROM or program memory 14. When microprocessor 11 presents, on address bus 12, an address $ADDROM_i$ at which an instruction for reading secret data RDOpCode is present, this opcode is returned over the data bus. Then, the microprocessor presents, on address bus 13, addresses $ADDROM_{i+1}$ and $ADDROM_{i+2}$ at which data addresses are stored in non-volatile memory 2. Memory 14 returns addresses ADDNVMAH and ADDNVMAL over data bus 13. It is here assumed that the capacity of the non-volatile memory requires using two words on bus 13 (for example, 2 bytes). The processor then reconstitutes address ADDNVMA and presents it on address bus 12 for memory 2. This address corresponds to the line in which data DA of the accessible area is located and this data is thus returned over bus 13. Internally, address bus ADDNVM of the non-volatile memory then presents thereto address ADDNVMSA of secret data DSA which is then returned on output DOUT without however being presented on bus 13. The memory then provides data DSA while the processor fetches the next instruction (address $ADDROM_{i+3}$) from program memory 14. The generation of address ADDNVMSA by decoder 26 of the non-volatile memory is automatic, for example, by an address offsetting (OFFSET).

Memory 2 of course contains, in its accessible area 24, data which are not associated with a secret key. In this case, the decoder provides no second data.

The implementation of embodiments of course requires that the programmer to know the addresses that he should call in the accessible area and the decoder operation, to point to the secret data of the protected area that he desires to obtain.

Area 22 cannot be accessed by the microprocessor in user mode, that is, the decoder is not capable of interpreting an address that it receives and which points to the area. In test mode, at the end of the manufacturing, area 22 may however be made accessible so that the processor can store the secret keys in area 22 by directly addressing this area.

When the electronic circuit is being manufactured and tested, non-volatile memory 2 is totally empty. Its area 22 is however accessible to enable to write the secret keys. The secret keys are then stored by the test processing system. When the electronic circuit is irreversibly switched to the user mode, the non-volatile memory is no longer accessible by the processing system and only a reading, triggered by another reading from the accessible area, is allowed.

Further, the described mechanism is compatible with the protection method of above-mentioned patent EP 1880387. Reference may especially be made to FIGS. 3, 4A, and 4B of this patent and to their description to combine both protection mechanisms by executing the reading of data DA as a data read cycle described in this patent, and thus reading reference data from the memory and comparing it with an expected value. Such a combination makes the electric signature of the reading of secret data DSA identical to that of the reference data obtained by this patent.

According to an alternative embodiment, the described protection function may be activated on demand by the processing system.

Various embodiments have been described. Various alterations, modifications, and improvements will occur to those skilled in the art. Further, the implementation of the present invention based on the functional indications given hereabove is within the abilities of those skilled in the art, using usual programming and design techniques.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting data stored in a first memory area of a non-volatile memory, the method comprising acts of:
   in response to the processor issuing a memory access request in read or write mode, the memory access request comprising at least one second memory address in the non-volatile memory, the at least one second memory address in a second memory area different from the first memory area, using the at least one second memory address to calculate at least one first memory address in the first memory area;
   extracting from the non-volatile memory first data stored at the at least one first memory address; and
   providing the extracted first data to a circuit to be stored in one or more internal registers of the circuit, wherein the one or more internal registers of the circuit are inaccessible to the processor, and wherein the first data is provided to the circuit via a selector connected on the one hand to at least one data bus and on the other hand to the circuit.

2. The method of claim 1, further comprising acts of:
extracting from the non-volatile memory second data stored at the at least one second memory address, the second data being independent from the first data; and
providing the extracted second data to the processor via the at least one data bus, wherein the extracted first data is provided to the circuit without being on the at least one data bus.

3. The method of claim 2, wherein the act of using the at least one second memory address to calculate the at least one first memory address comprises offsetting the at least one second memory address.

4. The method of claim 1, wherein the circuit to which the first data is provided comprises a logic circuit.

5. The method of claim 4, further comprising:
processing the first data by the logic circuit; and
providing a result of the processing to the processor.

6. The method of claim 1, wherein said first data forms a secret key of an encryption or authentication algorithm.

7. An integrated circuit comprising:
a processor;
at least one data bus and an address bus accessible by said processor, the at least one data bus and the address bus being connected to at least one program memory and a non-volatile memory; and
the non-volatile memory connected to the at least one data bus and the address bus, wherein the non-volatile memory is, at a data output, associated with a selector connected on the one hand to the at least one data bus and on the other hand to a logic circuit that is inaccessible to the processor, wherein the non-volatile memory is configured to:
in response to the processor issuing a memory access request in read or write mode, the memory access request comprising at least one second memory address in the non-volatile memory, provide first data to the logic circuit, wherein the first data is extracted from at least one first memory address in the non-volatile memory, the at least one first memory address being calculated using the at least one second memory address, and wherein the first data is to be stored in one or more internal registers of the logic circuit that are inaccessible to the processor.

8. The integrated circuit of claim 7, further comprising:
an address decoder configured to calculate the at least one first memory address of the first data from the at least one second memory address.

9. The integrated circuit of claim 8, wherein the at least one first memory address is obtained by offsetting the at least one second memory address.

10. A chip card comprising the integrated circuit of claim 7.

11. The integrated circuit of claim 7, wherein the first data comprises a secret key of an encryption or authentication algorithm.

12. The integrated circuit of claim 7, wherein the first data comprises secret data.

13. The integrated circuit of claim 7, wherein the at least one first memory address at which the first data is stored is in a first area of the non-volatile memory from which data can only be read in response to reading from, or writing to, by the processor, a second memory area of the non-volatile memory, the second memory area being different from the first memory area.

14. The integrated circuit of claim 7, wherein the logic circuit is configured to process the first data and provide a result of the processing to the processor.

15. The integrated circuit of claim 7, wherein the logic circuit is configured to temporarily store the first data.

16. A system comprising:
an integrated circuit comprising:
a processor; and
a non-volatile memory that is associated with a selector connected to at least one data bus and to a logic circuit that is inaccessible to the processor, wherein the non-volatile memory is configured to:
in response to the processor issuing a memory access request in read or write mode, the memory access request comprising at least one second memory address of the non-volatile memory, provide first data to the logic circuit, wherein the first data is extracted from at least one first memory address in the non-volatile memory, the at least one first memory address being calculated using the at least one second memory address, and wherein the first data is to be stored in one or more internal registers of the logic circuit that are inaccessible to the processor.

17. The system of claim 16, wherein the integrated circuit further comprises:
an address decoder configured to calculate the at least one first memory address from the at least one second memory address.

18. The system of claim 17, wherein the address decoder is configured to calculate the at least one first memory address by offsetting the at least one second memory address.

19. The system of claim 16, wherein the first data comprises a secret key of an encryption or authentication algorithm.

20. The system of claim 16, wherein the at least one first memory address at which the first data is stored is in a first area of the non-volatile memory from which data can only be read in response to reading from or writing to, by the processor, a second memory area of the non-volatile memory, the second memory area being different from the first memory area.

21. The system of claim 16, wherein the logic circuit is configured to process the first data and provide a result of the processing to the processor.

22. The system of claim 16, wherein the logic circuit is configured to temporarily store the first data.

23. The system of claim 16, wherein the integrated circuit further comprises:
at least one data bus and an address bus accessible by the processor that are connected to at least one program memory and the non-volatile memory.

* * * * *